June 4, 1968  G. W. SMALL  3,386,481
STRIP GANG SAW
Filed April 19, 1965  3 Sheets-Sheet 1
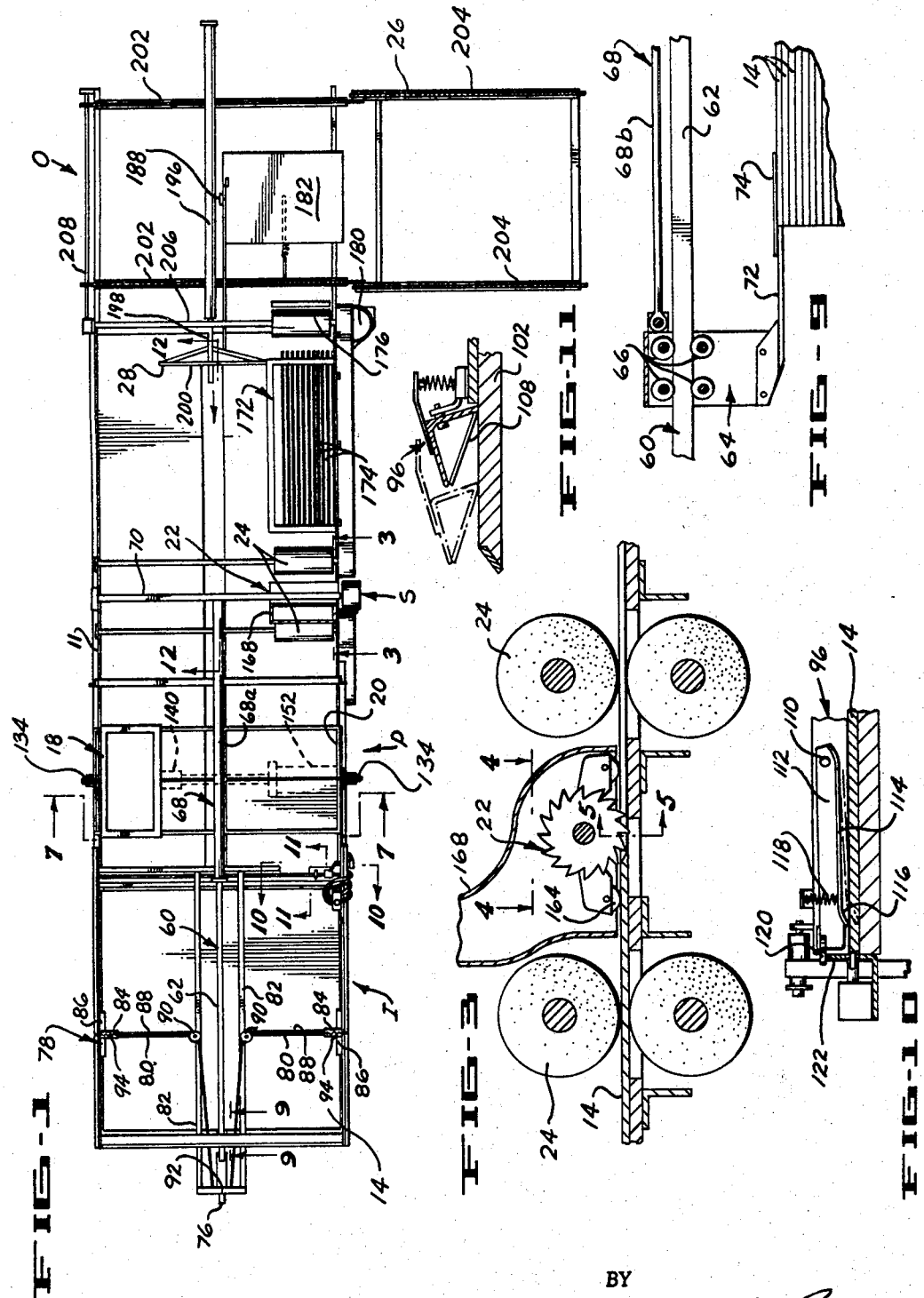
BY
Boniard I. Brown
ATTORNEY June 4, 1968  G. W. SMALL  3,386,481
STRIP GANG SAW
Filed April 19, 1965  3 Sheets-Sheet 2
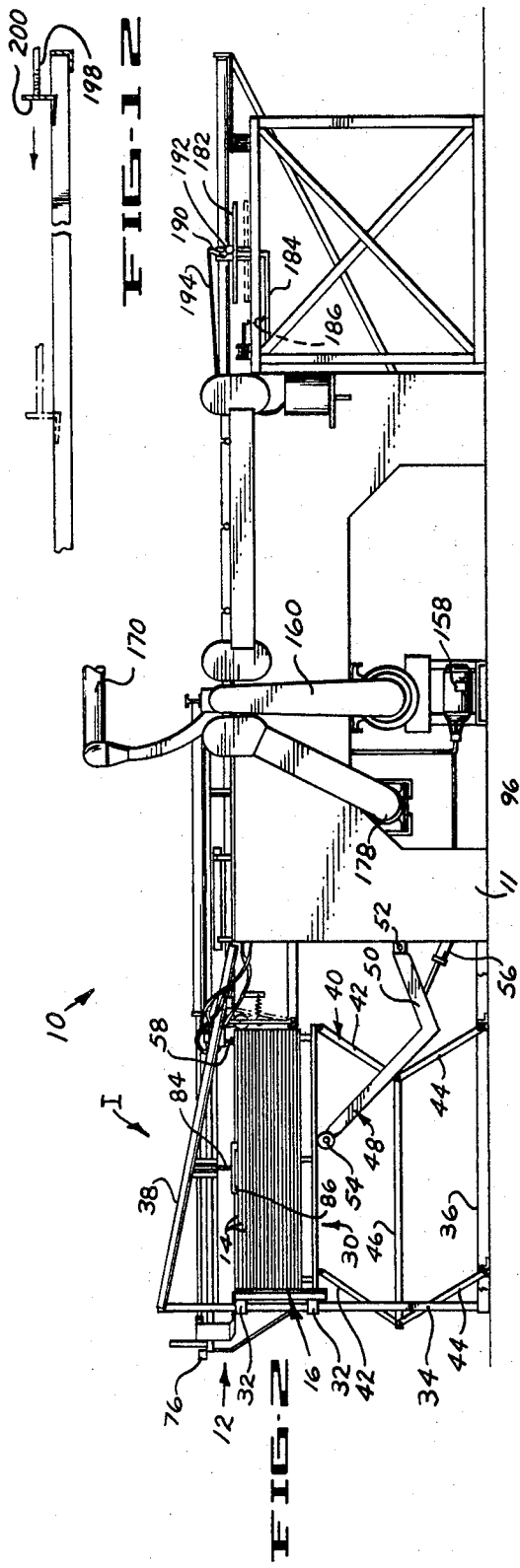
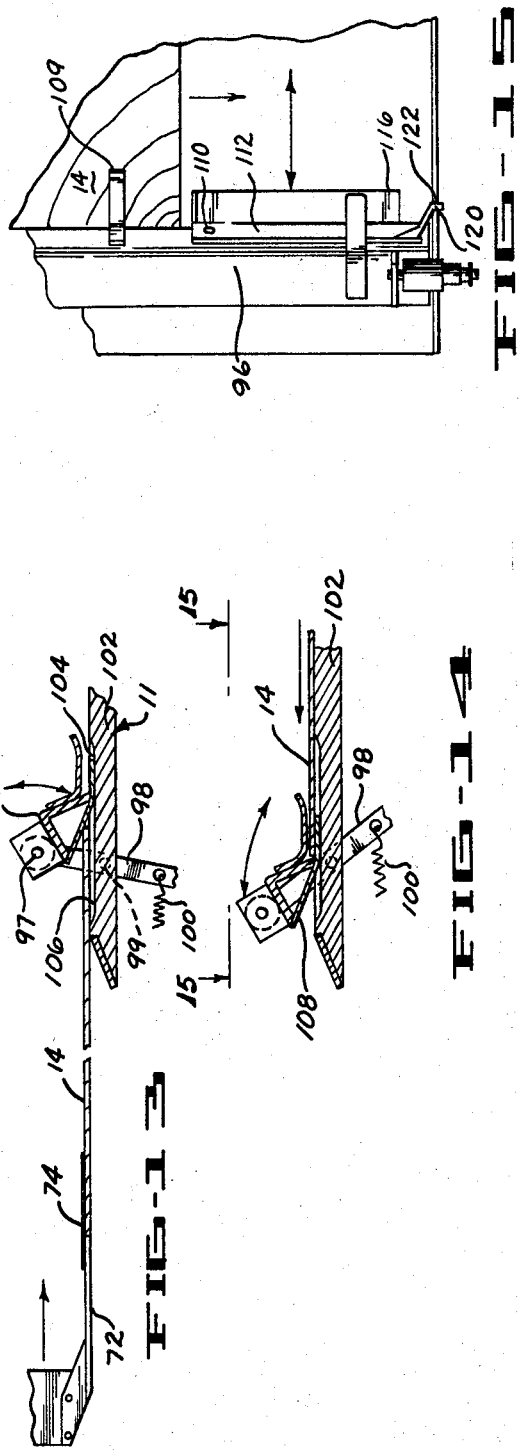
BY
Boniard I. Brown
ATTORNEY

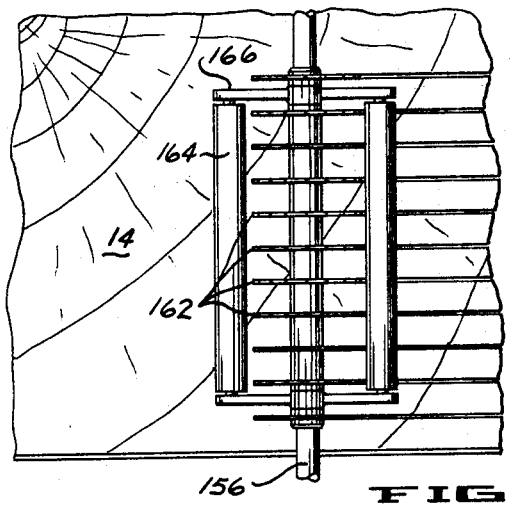
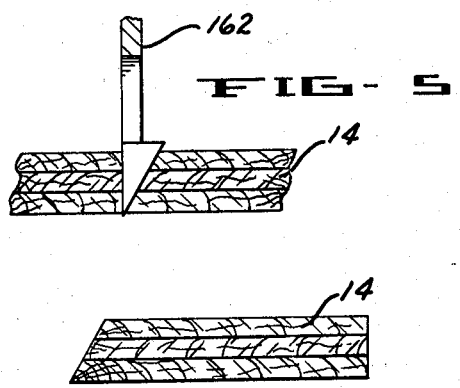
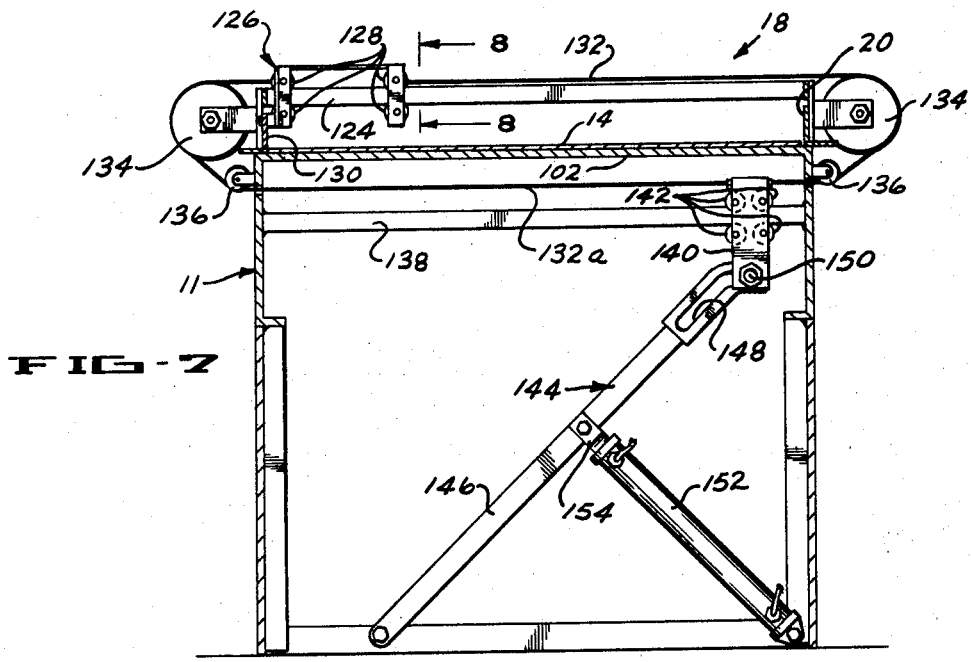
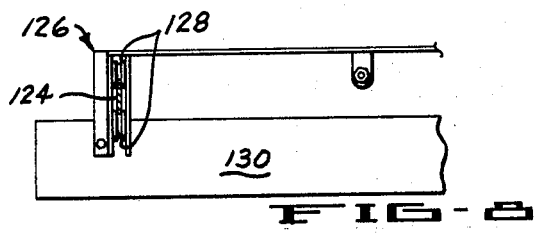

United States Patent Office 3,386,481
Patented June 4, 1968

3,386,481
STRIP GANG SAW
Guy W. Small, 5015 Elrovia Ave.,
El Monte, Calif. 91732
Filed Apr. 19, 1965, Ser. No. 464,257
11 Claims. (Cl. 143—33)

ABSTRACT OF THE DISCLOSURE

A gang saw for slitting sheet material into strips, having an infeed station, a slitting station, and an outfeed station.

---

This invention relates generally to slitting machines, and more particularly to a gang saw for slitting sheet material into strips.

In its broader aspects, the invention relates to an automatic gang saw for slitting or cutting sheet material into strips. Depending upon the type of saw blades which are installed on the machine, the sheet material upon which the machine operates may comprise wood, such as plywood sheets, metal, Masonite, plastic, or other material. In this regard, attention is directed to the fact that while the machine is referred to as a gang saw, the blades which are used in the machine may comprise other than saw blades, such as metal or plastic cutting discs.

It will become apparent as the description proceeds that the strips produced by the present automatic gang saw may be used for a variety of purposes. One particularly useful application of the saw, however, involves the cutting of wooden sheets into strips to be used in the manufacture of so-called carpet anchor strips which are employed to secure the marginal edges of a wall to wall carpet to the floor.

A general object of the present invention, therefore, is to provide an improved gang saw for sawing or otherwise slitting sheet material into strips or slats.

Another object of the invention is to provide a gang saw of the character described which is capable of operating on relatively large work sheets and wherein the power required to slit work sheet into strips is reduced to a minimum.

A further object of the invention is to provide a strip gang saw of the character described wherein the time and expense involved in maintaining the slitting blades of the machine in optimum cutting condition are minimized.

Yet a further object of the invention is to provide a gang saw of the character described which is relatively simple in construction, economical to manufacture, and otherwise ideally suited to its intended purposes.

Other objects, advantages, features of the invention will become readily apparent to those skilled in the art as the description proceeds.

Briefly, the objects of the invention are attained by providing a gang saw wherein each work sheet enters the machine at its infeed end and is fed longitudinally through a positioning station and a following slitting station. The slitting station is equipped with a slitting mechanism including, for example, a multiplicity of rotary slitting discs, or saw blades, disposed in planes parallel to and spaced transversely of the direction line of movement of each workpiece through the slitting station. The region gone between and including the two outermost slitting blades of this slitting mechanism is referred to as the slitting zone of the mechanism. The overall width of this slitting zone, measured transverse to the direction line of movement of each workpiece through the slitting station, is less than the width of each workpiece entering the infeed end of the machine. In a typical machine according to the invention, for example, the effective width of a slitting zone is one-fourth the width of each entering work sheet.

The positioning station of the machine is equipped with a cross feed mechanism for feeding each entering work sheet laterally against a guide to longitudinally align a portion of the work sheet with the slitting zone of the slitting station, whereby the aligned portion of the sheet is slit during subsequent movement of the sheet through the station. The strips emerging from the slitting station are conveyed to the outfeed end of the machine.

At this point, therefore, it is apparent that only a portion of each work sheet is slit during initial movement of the sheet through the slitting station. According to the present invention, the machine is equipped with a return mechanism which is rendered operative, after each passage of a work sheet through the slitting station, to return the unslit portion of the sheet to the positioning station. The unslit portion of the sheet is then laterally repositioned by the cross feed mechanism to align the next longitudinal section of the sheet with the slitting zone of the slitting station, after which the sheet is again fed longitudinally through the slitting station to slit the latter section of the sheet. This successive longitudinal movement of the work sheet through the slitting station, return of the unslit portion of the sheet to the positioning station, lateral repositioning of the unslit portion of the sheet, and return of the unslit portion through the slitting station is continued until the entire work sheet has been cut into strips.

According to the preferred practice of the invention, the work sheets to be slit are placed in a stack at the infeed end of the machine and are delivered to the latter end of the machine by an infeed mechanism. This infeed mechanism is controlled in such manner that the movement of each succeeding work sheet into the infeed end of the machine is delayed until slitting of the preceding work sheet is completed. The machine is equipped with an outfeed mechanism for receiving the strips as they emerge from the machine and delivering the strips to an outfeed conveyor which carry the strips to a suitable receiver.

Other objects, features and advantages of the present invention will become apparent to those versed in the art from a consideration of the following description, the appended claims and the accompanying drawings, wherein:

FIGURE 1 is a plan view of the present gang saw;
FIGURE 2 is a side elevation of the gang saw;
FIGURE 3 is an enlarged section taken on line 3—3 in FIGURE 1;
FIGURE 4 is a section taken on line 4—4 in FIGURE 3;
FIGURE 5 is a fragmentary enlarged section through a cutting disc of the gang saw;
FIGURE 6 illustrates the cut made by the cutting disc in FIGURE 5;
FIGURE 7 is an enlarged section taken on line 7—7 in FIGURE 1;

FIGURE 8 is an enlarged section taken on line 8—8 in FIGURE 7;

FIGURE 9 is an enlarged section taken on line 9—9 in FIGURE 1;

FIGURE 10 is an enlarged section taken on line 10—10 in FIGURE 1;

FIGURE 11 is an enlarged section taken on line 11—11 in FIGURE 1;

FIGURE 12 is an enlarged section taken on line 12—12 in FIGURE 1;

FIGURE 13 is an enlarged section illustrating the infeed mechanism of the machine during its infeed stroke;

FIGURE 14 illustrates the cross arm shown at the right in FIGURE 13, during return of a work sheet from the slitting station to the positioning station; and FIGURE 15 is a view looking in the direction of the arrows on line 15—15 in FIGURE 14;

The slitting machine or gang saw 10 illustrated in these drawings comprises an infeed station I, a lateral positioning station P, a slitting station S, and an outfeed station O arranged in the order listed along the frame 11 of the machine. At the infeed station I is an infeed mechanism 12 which successively delivers work sheets 14 from a supply stack 16 to the positioning station P. The positioning station includes a crossfeed mechanism or conveyor 18 which positions each work sheet laterally against a work guide 20, thereby to locate the sheet for proper entrance into the following slitting station S. Included at the slitting station is a slitting mechanism 22 and feed rolls 24 for conveying each work sheet from the positioning station P, through the slitting station S, to the outfeed station O. During movement of the work sheet through the slitting station, a longitudinal section of the work sheet is cut into strips or slats by the slitting mechanism 22. These strips are delivered to an outfeed conveyor 26 at the outfeed station O for transfer to a selected receiver.

The slitting station S includes a return feed mechanism or conveyor 28 for returning the unslit portion of the work sheet, remaining after initial passage of the work sheet through the slitting station S, to the positioning station P. After its return to the positioning station, the unslit portion of the sheet is repositioned laterally against the work guide 20 and is thereafter again fed forwardly through the slitting station S to slit another longitudinal section of the work sheet into strips. These strips are delivered to the outfeed conveyor 26. The unslit portion of the work sheet remaining after the second pass of the sheet through the slitting station is again returned to the positioning station P for lateral repositioning against the work guide 20 and subsequent movement through the slitting station S. This action is repeated until the entire work sheet has been cut into strips. The infeed mechanism 12 then delivers the next work sheet 14 into the machine.

With this general functional description of the machine in mind, we proceed now with a more detailed description of the several operating stations of the machine. Referring first to the infeed station I, the infeed mechanism 12 comprises a platform 30 for supporting the stack 16 of work sheets 14. Rigidly mounted at one end of this platform are sleeve bearings 32 which slide on vertical guide rods 34. Guide rods 34 are rigidly secured at their lower ends to lower horizontally extending members 36 of the machine frame 11 and are attached at their upper ends to the frame by braces 38. Pivotally connected between the underside of the platform 30 and the frame members 36 is a parallel linkage mechanism 40 including upright parallel links 42 and 44, and horizontal connecting links 46 which pivotally join the pivotally connected ends of the upright links 42 and 44. From this description, it is apparent that the guide rods 34 and the parallel link mechanisms 40 support the platform 30 for vertical movement while the platform remains in a horizontal plane.

Indicated at 48 is a mechanism for elevating the platform. This elevating mechanism comprises elevating arms 50 (only one shown), one end of which are pivotally connected at 52 to the infeed end of the machine frame 11. The opposite, or outer ends of the elevating arms 50 mount rollers 54 which engage the under surface of the platform 30. The elevating arms 50 are rigidly interconnected, whereby upward swinging movement of the arms, about their pivotal connection 52, elevates the platform 30. Operatively connected between the machine frame 11 and the elevating arms 50 is a hydraulic actuator 56 for rotating the elevating arms 50 upwardly, thereby to elevate the platform. Mounted on the machine frame 11, over the platform 30 so as to engage the uppermost work sheet 14 in the supply stack 16, is a stop 58.

Also included in the infeed mechanism 12 is an infeed conveyor 60. This infeed conveyor comprises a supporting rail 62 rigid on the machine frame 11 and located over the platform 30, a distance above the platform elevating limit switch 58. As shown best in FIGURE 1, the supporting rail 62 extends lengthwise of the machine frame 11, approximately along the longitudinal center line of the frame. Movably supported on the rail 62 is an infeed conveyor carriage 64 including rollers 66 which ride on the upper and lower edges of the rail. The infeed conveyor carriage 64 is driven back and forth along the rail 62 by a hydraulic linear actuator 68 including a long hydraulic cylinder 68a which is attached at one end to a cross member 70 rigid on the machine frame 11. The piston rod 68b of the actuator 68 is attached to the infeed conveyor carriage 64, whereby the hydraulic actuator 68 is effective to drive the infeed carriage 64 back and forth along its supporting rail 62.

Fixed to the under side of the infeed conveyor carriage 64 is a pusher plate 72. The thickness of this pusher plate is substantially equal to or slightly less than the thickness of each work sheet 14 in the stack 16. Fixed to the upper surface of and extending forwardly from the pusher plate 72 is a hold down plate 74. When the infeed carriage 64 is situated at the left-hand limiting position of its infeed stroke, the leading edge of the pusher plate 72 is located to the left of the stack 16 of work sheets 14 and the hold down plate 74 overlies the stack. The stop 58 is vertically positioned to be engaged by the uppermost work sheet 14 in the supply stack 16, and thereby terminates elevating movement of the elevating mechanism 48, when the uppermost work sheet contacts the hold down plate 74 and is thereby located in the plane of the pusher plate 72. Under these conditions, right-hand infeed movement of the infeed conveyor carriage 64 from its left-hand limiting position is effective to feed the uppermost work sheet from the stack 16 to the positioning station P.

As will be explained later, the infeed conveyor carriage 64 is returned to the left-hand limit of its infeed stroke immediately following each right-hand infeed stroke of the carriage. Fixed to the left-hand of the infeed carriage supporting rail 62 is a limit stop 76 which is engaged by the carriage upon arrival of the latter at the left-hand limit of its infeed stroke.

During this left-hand return stroke of the infeed carriage 64, the uppermost work sheet 14 in the supply stack 16 is laterally positioned in alignment with the infeed carriage by a lateral positioning mechanism 78. This lateral positioning mechanism includes a pair of longitudinally aligned, laterally extending tracks 80 overlying the supply stack 16, between the ends of the infeed station I. The inner ends of the tracks 80 are supported on bars 82 mounted on the machine frame 11, at opposite sides of the infeed carriage rail 62. The outer ends of the tracks 80 are attached to the braces 38 which support the upper ends of the guide rods 34 for the supply stack supporting platform 30. Mounted on the tracks 80, for movement therealong, are positioning guides 84 having horizontal depending flanges 86 disposed in vertical planes parallel to the direction line of movement of the infeed carriage 64 and arranged for engagement with the side edges of the uppermost work sheet 14 in the supply stack 16. Attached at one end to each lateral positioning guide 84 is a cable 88. Cables 88 are trained around pulleys 90 rotatably mounted on the inner track supporting bars 82 and are attached at their opposite ends to a slide 92 which is movably supported on the infeed carriage rail 62, to the left of the infeed carriage 64. During its left-hand return stroke, the infeed carriage engages slide 92 and drives the latter to the left, thereby drawing the lateral positioning guides 84 inwardly toward one another. During this inward movement of the guides, the guide flanges 86 engage the side edges of the uppermost work sheet 14 in the supply stack 16, and center the work sheet laterally relative to the infeed carriage 64. The lateral positioning guides 84 are returned to their outer limiting positions during the right-hand infeed stroke of the infeed carriage 64 by return springs 94. This outward movement of the positioning guides, of course, draws the lateral positioning slide 92 to the right along the infeed carriage rail 62 for engagement by the infeed carriage 64 during the subsequent left-hand return stroke of the carriage.

Extending laterally of the machine frame 11, between the infeed station I and the positioning station P, is a cross arm 96. Pivotally connected at 97 to the ends of this cross arm are support arms 98. These support arms are pivotally connected intermediate their ends, at 99, to the machine frame 11 and support the cross arm 96 for lateral movement lengthwise of the machine frame 11. It will be observed that the pivotal connections 97 between the cross arm and its support arms are laterally offset from the cross arms to permit vertical swinging movement of the cross arm relative to the machine frame. Cross arm 96 is laterally movable lengthwise of the machine frame 11 between its forward limiting position of FIGURE 13 and its rear limiting position of FIGURE 14. Stops (not shown) are provided on the machine frame 11 for limiting this lateral movement of the cross arm. The cross arm is normally retained in its forward limiting position of FIGURE 13 by springs 100 connected between the supporting arms 98 and the machine frame. Gravity normally retains the cross arm in its lower position of FIGURES 13 and 14, wherein the cross arm rests on a bed plate 102 which forms part of the machine frame. Along the lower edge of and projecting forwardly from the cross arm is a plate 104. When a cross arm rests on the bed plate 102, this cross arm plate engages in a groove 106 in the bed plate 102, thereby to locate the upper surface of the cross arm plate flush with the upper surface of the bed plate.

A cross arm 96 is generally triangular and transverse in cross section and includes a rear upwardly sloping surface 108 which is presented toward the infeed station I. When a work sheet 14 is fed from the infeed station to the positioning station P, by the infeed carriage 64, the leading edge of the work sheet engages the sloping surface 108 of the cross arm and cams the latter upwardly out of supporting contact with the bed plate 102 to permit the work sheet to pass beneath the arm. The infeed carriage 64 advances the work sheet to a position in which the leading edge of the sheet engages under the rear feed rolls 24 at the slitting station S. These feed rolls, and the forward feed rolls 24 at the slitting station, then continue to feed the work sheet through the slitting station to the outfeed station O.

As mentioned earlier and hereinafter described in greater detail, only a portion of each work sheet is slit into strips during the initial pass of the sheet through the slitting station S. The remaining uncut portion of the sheet is then returned to the positioning station P, after which the sheet is again fed through the slitting station. The uncut portion of each work sheet is thus returned to the positioning station P by the return conveyor 28 which urges the sheet against the cross arm 96, thereby moving the latter rearwardly, to its rearward limiting position of FIGURE 14, against the action of the cross arm springs 100. During this return movement of the sheet, the trailing edge of the sheet rides over the cross arm plate 104, as shown in FIGURE 14, which plate is then disposed within the bed plate groove 106, flush with the upper surface of the bed plate. Fixed to and extending forwardly from the front side of the cross arm are retaining fingers 109 which engage over the trailing edge of the work sheet to prevent the latter from sliding upwardly along the sloping, forwardly presented surface of the cross arm. Pivotally mounted at one end, by a pivot pin 110, on the forwardly presented surface of the cross arm, adjacent the end of the cross arm proximate to the work guide 20 at the positioning station P, is a latch arm 112. This latch arm has a lower, forwardly directed flange 114 which terminates, at the end thereof adjacent the work guide 20, in a downturned lip 116. A spring 118, acting between the cross arm 96 and the latch arm flange 114, yieldably retains the latch arm at its lower position, illustrated in phantom lines in FIGURE 10, wherein the latch arm flange 116 contacts the bed plate 102. Extending from the free end of the latch arm 112 is a detent 120 which is engageable in a notch 122 in the upper edge of the work guide 20 when the cross arm 96 occupies its rear limiting position of FIGURE 14. During return, by the return conveyor 28, of each uncut portion of a work sheet from the slitting station S to the positioning station P, the trailing edge of the sheet is thrust rearwardly against the cross arm 96 and urges the latter to its rear limiting position of FIGURE 14, wherein the latch detent 120 engages in its notch 122, thereby to retain the cross arm in its rear limiting position, against the action of the cross arm return springs 100.

Immediately after the return of the uncut portion of each work sheet against the cross arm 96, to effect latching of the latter in its rear position of FIGURE 14, as just described, the cross feed conveyor 18 is operated to feed the work sheet laterally of the machine frame 11, toward and finally against the work guide 20 at the positioning station P. Referring to FIGURE 7, this cross feed conveyor comprises a pair of spaced parallel tracks 124 which extend crosswise of and are terminally supported on the machine frame 11, a distance above the bed plate 102 thereof. The cross feed conveyor carriage 126 is movably supported on these tracks by rollers 128 on the carriage. Secured to and depending below the rear end of this carriage, that is the end of the carriage remote from the work guide, 20, is a pusher plate 130. A cable 132 is secured at opposite ends to the ends, respectively, of the conveyor carriage 126 and is trained about pulleys 134 and 136 rotatably mounted on opposite sides of the machine frame in such manner that the cable has a lower horizontal run 132a which extends crosswise of the machine frame below the bed plate 102 thereof. Below the lower cable run 132a are a pair of tracks 138 which extend crosswise of and are terminably supported on the machine frame. A cable drive carriage 140 is movably supported on these tracks by rollers 142. The upper end of this carriage is secured to the lower cable run, whereby movement of the carriage along its supporting tracks 138 is effective to drive the cross feed conveyor carriage 126 along its supporting tracks 124. The cable drive carriage 140 is driven back and forth along its supporting tracks 138 by a hydraulic actuator 144. This actuator includes a drive arm 146 which is pivotally attached at its lower end to the machine frame 11 for swinging on an axis extending lengthwise for the frame. In the upper end of the drive arm 146 is a slot 148 through which extends a connecting pin 150 on the cable drive carriage 140. Indicated at 152 is a double acting hydraulic cylinder, the lower end of which is pivotally connected to the machine frame 11. The rod 154 of the cylinder piston is pivotally attached to the drive on 146 at a point intermediate its ends. It is apparent from the preceding description and FIGURE 7 that the admission of pressure fluid to the lower end of the actuator cylinder 152 is effective to move the cable drive carriage 140 to the left in the figure along its supporting tracks 138 and thereby to drive the cross feed conveyor carriage 126 to the right along its supporting tracks 124. Admission of pressure fluid to the upper end of the cylinder 152 is effective to return the cross feed conveyor carriage to its position of FIGURE 7. The position of the conveyor carriage illustrated in FIGURE 7 is hereafter referred to as its normal or retracted position.

It will be recalled that the cross feed conveyor 18 is operated upon return of the uncut portion of each work sheet from the slitting station S to the positioning station P. During each such operation of the cross feed conveyor, the cross feed conveyor 126 is driven from its retracted position of FIGURE 7 toward the work guide 20, thereby to feed the returned work sheet toward and finally into contact with the work guide 20. The work sheet is thus properly positioned, by the work guide, for its next pass through the slitting station S. It will be recalled that the cross arm 96 is currently latched in its rear retracted position. In this retracted position of the cross arm, the spacing between the latter and the rear feed roll 24 at the slitting station is slightly greater than the dimension of each work sheet measured lengthwise of the machine frame 11. Accordingly, when a work sheet is fed, by the cross feed conveyor 18, transversely of the machine frame to its position of re-engagement with the work guide 20, the leading end of the sheet does not immediately engage the rear feed rolls. However, as each work sheet approaches the work guide, during its return movement transversely across the machine frame under the action of the cross feed conveyor, the side edge of the sheet contacts the down-turned lip 116 on the latch bar 112, thereby elevating the latch bar to its solid line position of FIGURE 10. This retracts the latch bar detent 120 from its notch 122, thereby releasing the cross arm 96 for movement to its forward extended position of FIGURE 13 under the action of the cross arm return spring 100. This forward movement of the cross arm feeds each work sheet forwardly along the machine frame 11 toward the slitting station S to a position wherein the leading edge of the sheet enters between the rear feed rolls 24. The work sheet is then fed once again through the slitting station by these feed rolls and the forward feed rolls 24. This successive passage of each work sheet through the slitting station S and return of the uncut portion of the work sheet to the positioning station P is repeated until the entire work sheet has been slit into strips of slats.

The slitting mechanism 22 at the slitting station comprises a shaft 156 which is rotatably supported on the machine frame 11 for turning on an axis extending transversely of the frame. Shaft 126 is driven in rotation by a motor 158 through a transmission enclosed within a housing 160. Keyed on the shaft 156 are a number of rotary slitting blades 162 which are uniformly spaced along the shaft as shown. Located in front of and behind the slitting blades 162 are hold-down rollers 164 which are rotatably supported at their ends in brackets 166 rotatably mounted on the shaft 156. These hold-down rollers ride along the upper surface of each work sheet during its passage through the slitting station and serve to hold the work sheet firmly against the bed plate 102. The slitting mechanism 22 is enclosed in a housing 168 which is connected to a vacuum system 170 for exhausting the sawdust created by the slitting mechanism during each passage of a work sheet through the slitting station. It will be observed in the drawings that the axial dimension of the slitting mechanism 22 is approximately one-third of the original width of each work sheet 14. Thus, slitting of an entire work sheet requires three successive passes of the work sheet through the slitting station.

Located just beyond the slitting station S is a strip receiver 172 for receiving the cut strips or slats emerging from the latter station. This strip receiver includes a number of spaced parallel guides 174 which are secured to the bed plate 102 and are spaced to receive the emerging strips therebetween and to guide the strips from the slitting station to the outfeed station O. Following the strip receiver are feed rolls 176 which feed the cut strips from the receiver to the outfeed station. Feed rolls 24 are driven by a motor 178. Feed rolls 176 are driven by a motor 180.

The outfeed station O comprises a horizontal plate 182 which is rigidly secured to one end of an arm 184, the other end of which is pivotally attached to the machine frame 11 for swinging about a horizontal axis extending transverse of the frame. Arm 184 supports the plate 182 on the frame for vertical movement between its upper solid line position and its lower phantom line position of FIGURE 2. The plate is yieldably urged to its upper position by a spring 186 connected between the arm 184 and the machine frame 11. Rigidly mounted on the bed plate 102 adjacent the upper edge of the plate 182, as the latter is viewed in FIGURE 1, is a bracket 188. This bracket pivotally supports a bell crank 190, the lower arm of which mounts a roller 192 for engaging the plate 182. Engagement of the plate with its roller, therefore, limits upward movement of the plate under the action of its return spring 186. Pivotally attached to the other arm of the bell crank 190 is a rod 194 which extends rearwardly toward the slitting station S.

The return conveyor 28 comprises a double acting cylinder 196 mounted on and extending lengthwise of machine frame 11, a distance above the bed plate 102. Extending from the rear end of this cylinder is the rod 198 of the cylinder piston. A crosshead 200 is secured to the rear end of the piston rod 198 and has its lower edge disposed in close proximity to the bed plate 102 for engagement with the edge of the work sheet resting on the bed plate. Admission of pressure fluid to the end of the cylinder 196 remote from the slitting station S drives the crosshead 200 rearwardly toward the positioning station P, thereby to return a work sheet engaged by the crosshead from the slitting station to the positioning station, as described earlier. Admission of pressure fluid to the other end of the cylinder 196 returns the crosshead to its normal return to position of FIGURE 1. The free end of the bell crank operating rod 194, that is the left-hand end of the rod, as the latter is viewed in FIGURE 1, is disposed for engagement by the crosshead 200 of the return conveyor 28, during right-hand return movement of the crosshead to its retracted position of FIGURE 1. Continued right-hand return movement of the crosshead after initial engagement of the crosshead with the bell crank operating rod 194 drives the rod to the right in FIGURE 1, thereby rotating the bell crank 190 in a direction to move the plate 182 at the outfeed station O from its upper solid line position in FIGURE 12 to its lower phantom line position in that figure.

The outfeed conveyor 26 at the outfeed station O comprises a first pair of horizontal conveyor chains 202 which extend crosswise of machine frame 11, at opposite sides of the outfeed plate 182. The outfeed conveyor includes a second pair of conveyor chains 204 which extend laterally outward beyond the side of the machine frame and are driveably connected at their inner ends to the conveyor chains 202. Conveyor chains 202, in turn, are driven from the motor 180 through driveably coupled drive shafts 206 and 208. When the outfeed plate 182 occupies its upper position of FIGURE 2, the upper surface of the plate is substantially flush with the bed plate 102. The upper runs of the conveyor chains 202 are located slightly below the upper surface of the bed plate. During operation of the machine, the feed rolls 176 feed the cut strips from the strip receiver 174 on to the outfeed plate 182 while the latter is in its upper position. This plate is then lowered, by operation of the bell crank 190 in a manner hereinafter explained, to lower the strips onto the outfeed conveyor chains 202. These conveyor chains convey the strips laterally to the conveyor chains 204 which, in turn, convey the strips from the machine.

The operation of the machine will now be described. In describing this operation, it will be assumed that the several hydraulic cylinders of the machine are manually controlled in such a way as to accomplish the sequence of events discussed below. The control valves for these cylinders have been omitted for the sake of clarity. It will become immediately apparent to those skilled in the art, however, that the machine may be automated by the provision of appropriate automatic controls for the various cylinders.

With this preliminary discussion in mind, the sequence of events which occur during the operation of the machine will now be explained. At the start of each operating cycle of the machine, the infeed conveyor carriage 64 is retracted against its left-hand limit stop 76, as shown in FIGURE 1, the cross feed conveyor carriage 126 is retracted away from the work guide 20, as shown in FIGURE 7, and the crosshead 200 of the return conveyor 28 is retracted to the right-hand limit of its stroke, as shown in FIGURE 1. The cross arm 96 occupies its forward limiting position, as shown in FIGURE 13. Pressure fluid is now admitted to the lower end of the cylinder 56 in the supply stack platform elevating mechanism 48 to elevate the stack 16 of work sheets 14 to the position of FIGURE 2, wherein the upper work sheet engages against the stop 58. Pressure fluid is then admitted to the left-hand end of the infeed conveyor cylinder 68 to drive the infeed conveyor carriage 64 to the right in FIGURE 1, thereby to feed the upper work sheet 14 in the stack 16 under the cross arm 96 and through the positioning station P to a position wherein the leading end of the work sheet engages between the rear feed rolls 24 at the slitting station S. These feed rolls and the forward feed rolls 24 at the latter station, then convey the sheet through the slitting station. During the initial pass of the work sheet through the slitting station, the blades 162 of the slitting mechanism slit a portion (approximately one-third) of the sheet into strips which enter the strip receiver 174. Immediately upon emergence of the worksheet from the slitting mechanism 22, pressure fluid is admitted through the right-hand end of the return cylinder 196 to drive the return conveyor crosshead 200 to the left in FIGURE 1. This left-hand movement of the crosshead releases the outfeed plate 182 for movement to its upper position of FIGURE 2 and simultaneously returns the uncut portion of the worksheet to the positioning station P. The distance between the forward feed rolls 24 at the slitting station S and the feed rolls 176 following the strip receiver 174 is slightly less than the connection of each work sheet measured lengthwise of the machine frame 11. Accordingly, the forward feed rolls 24 are effective to feed the emerging cut strips through the strip receiver 172 to the feed rolls 176 which then continue to feed the strips of the outfeed plate 182. The left-hand movement of the return conveyor 28 is so timed that the outfeed plate is released for return to its upper position of FIGURE 2 prior to arrival of the leading ends of the cut strips at the plate, whereby the feed rolls 176 are effective to feed the strips from the strip receiver 174 onto the elevated outfeed plate. The cut strips remain on this plate momentarily.

During return of the uncut portion of the work sheet to the positioning station P by the return conveyor 28, the sheet engages the currently extended cross arm 96 and moves the latter rearwardly to its retracted position of FIGURE 14. The latch detent 120 on the cross arm then engages in the slot 122 in the work guide 20 to latch the cross arm in its return to position. Immediately upon latching of the cross arm in its retracted position, pressure fluid is admitted to the lower end of the crossfeed conveyor cylinder 152 to drive the crossfeed conveyor carriage 126 toward the work guide 20 to a position in which the returned work sheet contacts the guide and is thereby properly positioned for its next pass through the slitting station S. Pressure fluid is then admitted to the upper end of the crossfeed conveyor cylinder 152 to return the crossfeed conveyor 126 to its retracted position of FIGURE 7.

As the work sheet approaches the work guide 20, the edge of the sheet engages the down-turned lip 116 on the cross arm latch bar 112, thereby elevating the latch bar to retract the latch detent 120 from its notch 122. The cross arm 96 is then released for movement to its forward extended position of FIGURE 13 under the action of its return springs 100. This forward movement of the cross arm returns the work sheet to the slitting station S to slit the next portion of the sheet. The return conveyor 28 is then again operated to return the final remaining uncut portion of the work sheet to the positioning station P and the above operation of the machine is repeated.

Each time the return conveyor 28 is returned to its retracted position of FIGURE 1, the conveyor crosshead 200 engages the bell crank operating rod 194 and drives the latter forwardly to lower the outfeed plate 182 to its phantom line position of FIGURE 2. During this downward movement of the outfeed plate, the ends of the cut strips supported thereon engage the outfeed conveyor chains 202 and are conveyed thereby from the machine. The conveyor plate then returns to its upper position, during the next left-hand stroke of the return conveyor in readiness to receive the next supply of cut strips delivered by the feed rolls 176 from the strip receiver 174.

After the entire work sheet has been cut into strips, in the manner described above, the stack 16 of work sheets 14 is again elevated to a position where the uppermost work sheet engages the stop 58 and the infeed conveyor carriage 64 is again driven in its right-hand infeed stroke to deliver the upper work sheet to the slitting station S and thereby initiate the next operating cycle of the machine.

While the invention has been herein shown and described in what is conceived to be its most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new and supportable Letters Patent is:

The inventor claims:

1. A gang saw comprising a frame, an infeed station, a positioning station, a slitting station, and an outfeed station spaced along said frame, infeed conveyor means for feeding a work sheet from said infeed station through said positioning station to said slitting station, a work guide on said frame at said positioning station for locating said work sheet laterally of said frame in a position wherein one longitudinal edge of said work sheet is aligned with one side of said slitting station, means at said slitting station for receiving said work piece from said infeed conveyor means and feeding said work piece through said slitting station, slitting means at said slitting station for slitting said work sheet into strips, said slitting means having an overall cutting width less than the original width of said work sheet, whereby a portion only of said work sheet is slit during the initial pass of the work sheet through said slitting station, return conveyor means at said slitting station for returning the uncut portion of said work piece from said slitting station to said positioning station, crossfeed conveyor means at said positioning station for feeding the returned work piece laterally across said frame towards said work guide to a position of engagement of the cut edge of the returned work sheet with said work guide, additional conveyor means at said positioning station for feeding the returned work piece to said slitting station, and means for conveying the cut strips emerging from said slitting station to said outfeed station.

2. A gang saw according to claim 1 including a platform at said infeed station for supporting a stack of work sheets, and means operatively connected to said platform for progressively elevating the platform to a position wherein the upper work sheet in such stack is disposed for engagement by said infeed conveyor means during the infeed stroke thereof.

3. A gang saw according to claim 2 including a pair of lateral positioning guides mounted on said frame over said platform at said infeed station for movement along direction lines normal to the direction line of movement of each work sheet from said infeed station to said slitting station, means operatively connecting said lateral positioning guides and said infeed means for effecting inward movement of said lateral positioning guides toward one another in unison during the return stroke of said infeed conveyor means, said lateral positioning guides being disposed to engage the side edges of the upper work sheet in said stack, thereby to position said upper work sheet laterally of said frame, and means for returning said lateral positioning guides outwardly during the infeed stroke of said infeed conveyor means.

4. A gang saw according to claim 1 wherein said additional conveyor means comprises a crossarm extending transversely across said frame between said infeed station and positioning station, means mounting said crossarm on said frame for movement lengthwise of said frame between a retracted position adjacent said infeed station and an extended position adjacent said slitting station and for vertical movements relative to said frame, means whereby said crossarm is elevated during movement of said work sheet from said infeed station to said slitting station, thereby to permit said work sheet to pass beneath said crossarm, said work sheet engaging said crossarm during return movement of said work sheet from said slitting station to said positioning station by said return conveyor means, thereby to move said crossarm to said retracted position thereof, and means operatively connected to said crossarm for moving the latter to said extended position thereof in response to lateral movement of the returned work sheet against said work guide by said crossfeed conveyor means, thereby to feed the returned work sheet to slitting station.

5. A gang saw according to claim 1 wherein said additional conveyor means comprises a crossarm extending across said frame between said infeed station and said positioning station, means mounting said crossarm on said frame for movement of said crossarm lengthwise of said frame between a retracted position adjacent said infeed station and an extended position adjacent said slitting station and for vertical movement of said crossarm relative to said frame, means whereby said crossarm is elevated by said work sheet during movement of the latter from said infeed station to said slitting station by said infeed conveyor means, thereby to permit said work sheet to pass beneath said crossarm, spring means operatively connected between said frame and crossarm for resiliently urging the latter to said extended position, said crossarm being moved to said retracted position by said work sheet during return of the latter to said positioning by said return conveyor means, co-acting latch means on said frame and crossarm for releasably latching said crossarm in said retracted position, and said latch means including means engageable by said work piece during lateral movement thereof toward said work guide by said crossfeed conveyor means for releasing said latch means, thereby to release said crossarm for movement to said extended position under the action of said spring means.

6. A gang saw according to claim 1 wherein said crossfeed conveyor means comprises track means mounted over and extending crosswise of said frame at said positioning station, a crossfeed conveyor carriage mounted on said track means for movement therealong, a member on said carriage engageable with said work sheet while the latter is at said positioning station, and means operatively connected to said carriage for driving the latter back and forth along said track means.

7. A gang saw according to claim 6 wherein said means for driving said carriage comprises a cable attached at its ends to said carriage and having a lower run extending below and crosswise of said frame, track means mounted on and extending crosswise of said frame adjacent said lower cable run, a drive carriage mounted on said latter track means for movement therealong and connected to said lower cable run, and means for driving said drive carriage back and forth along said latter track means, thereby to drive said conveyor carriage back and forth along said first mentioned track means.

8. A gang saw according to claim 1 wherein said return conveyor means comprises a conveyor member mounted over said frame between said slitting station and outfeed station and movable lengthwise of said frame toward and away from said positioning station, and means on said conveyor member engageable with said work piece for feeding the latter from said slitting station to said positioning station during movement of said conveyor member toward said positioning station.

9. A gang saw according to claim 1 including an outfeed plate at said outfeed station for receiving said cut strips from said last mentioned conveyor means, means mounting said outfeed plate on said frame for movement between upper and lower positions, said outfeed plate when in said upper position being disposed to receive said cut strips from said last mentioned and conveyor means, outfeed conveyor means on said frame and said outfeed station disposed to receive said cut strips from said outfeed plate when the plate is in said lower position thereof, and means for moving said outfeed plate between said upper and lower positions in timed relation to the operation of said return conveyor means.

10. A gang saw according to claim 9 wherein said outfeed conveyor means comprises a conveyor member mounted over said frame between said slitting station and said outfeed station for movement lengthwise of said frame toward and away from said positioning station, means on said conveyor member engageable with said work piece for feeding from said slitting station to said positioning station, and said means for moving said outfeed plate in timed relation to the operation of said return conveyor means comprises spring means for urging said outfeed plate to said upper position thereof and means operatively connected to said outfeed plate and disposed for engagement by said conveyor member during return of the latter away from said positioning station for moving said outfeed plate to said lower position thereof.

11. A gang saw comprising a frame having an infeed station, a positioning station, a slitting station, and an outfeed station spaced therealong, an infeed conveyor carriage mounted on said frame at said infeed station for movement lengthwise of the frame between a retracted position remote from said positioning station and an extended position proximate to said positioning station, a platform at said infeed station for supporting a stack of work sheets, means operatively connected to said platform for progressively elevating said platform to a position wherein the upper work sheet in said stack is disposed for engagement by said infeed conveyor carriage during movement of the latter from said retracted position to said extended position, said infeed conveyor carriage being effective to feed the upper work sheet from said infeed station to said positioning station to said slitting station, means for driving said infeed carriage between said positions thereof, a work guide mounted on said frame and said positioning stations for locating each work sheet laterally of said frame in a position wherein on edge of the work sheet is aligned with one side of said slitting station, means at said slitting station for receiving each work piece delivered by said infeed carriage and conveying the work piece through such slitting station, slitting means at said slitting station for slitting each work piece into strips, said slitting means having an overall cutting width less than the original width of each work sheet, whereby a portion only of each work sheet is slit during the initial pass of the respective work sheet through said slitting station, return conveyor mounted on said frame at said slitting station for returning the uncut portion of each work sheet from said slitting station to said positioning station, a crossfeed conveyor mounted on said frame at said positioning station for feeding each returned work sheet laterally across said frame to a position of engagement of the cut edge of the return sheet with said work guide, a crossarm extending across said frame between said infeed station and said positioning station, means mounting said crossarm on said frame for movement lengthwise of said frame between a retracted position adjacent said infeed station and an extended position adjacent said slitting station and for vertical movement of said crossarm relative to said frame, spring means operatively connected between said frame and crossarm for resiliently urging the latter to said extended position thereof, said crossarm being urged to said retracted position thereof by each work sheet returned to said positioning station by said return conveyor, co-acting latch means on said frame and crossarm for releaseably latching the latter in said retracted position thereof, said latch means including means engaged by each returned work piece during lateral movement of the latter across said frame towards said work guide by said crossfeed conveyor for releasing latch means, thereby to release said crossarm for forward movement said extended position under the action of said spring means, and means for receiving the cut strips from said slitting station and conveying the strips to said outfeed station.

References Cited

UNITED STATES PATENTS

| | | | |
|---|---|---|---|
| 1,487,649 | 3/1924 | Foreman | 143—92.1 |
| 1,815,222 | 7/1931 | Swift | 143—33 |
| 2,669,263 | 2/1954 | Smith | 143—192.1 X |
| 2,987,089 | 6/1961 | Dennison | 144—245.5 X |

WILLIAM W. DYER, Jr. *Primary Examiner.*

W. D. BRAY, *Assistant Examiner.*